US008948091B2

(12) United States Patent
Lee

(10) Patent No.: US 8,948,091 B2
(45) Date of Patent: Feb. 3, 2015

(54) PUSH MANAGEMENT SCHEME

(75) Inventor: Hyoung-Gon Lee, Seoul (KR)

(73) Assignee: Empire Technology Development LLC, Wilmington, DE (US)

( * ) Notice: Subject to any disclaimer, the term of this patent is extended or adjusted under 35 U.S.C. 154(b) by 0 days.

(21) Appl. No.: 13/996,323

(22) PCT Filed: Jul. 10, 2012

(86) PCT No.: PCT/KR2012/005461
§ 371 (c)(1),
(2), (4) Date: Jun. 20, 2013

(87) PCT Pub. No.: WO2014/010761
PCT Pub. Date: Jan. 16, 2014

(65) Prior Publication Data
US 2014/0016554 A1    Jan. 16, 2014

(51) Int. Cl.
H04W 4/00    (2009.01)
H04W 76/04   (2009.01)

(52) U.S. Cl.
CPC ............. *H04W 76/045* (2013.01); *Y02B 60/50* (2013.01)
USPC ....................................................... 370/328

(58) Field of Classification Search
USPC .............. 370/229, 230, 230.1, 231, 235, 236, 370/328, 329, 351, 310, 311; 709/224, 223, 709/217, 203, 219, 204; 455/574
See application file for complete search history.

(56) References Cited

U.S. PATENT DOCUMENTS

| 2007/0186282 | A1* | 8/2007 | Jenkins | 726/22 |
| 2008/0059582 | A1* | 3/2008 | Hartikainen et al. | 709/204 |
| 2010/0069127 | A1* | 3/2010 | Fiennes | 455/574 |
| 2010/0250670 | A1* | 9/2010 | Wei | 709/203 |
| 2010/0309898 | A1 | 12/2010 | Zhao et al. | |
| 2011/0151944 | A1 | 6/2011 | Morgan | |
| 2011/0201326 | A1 | 8/2011 | Karabinis | |
| 2012/0284385 | A1* | 11/2012 | Kavanaugh et al. | 709/223 |
| 2013/0007484 | A1* | 1/2013 | Gobriel et al. | 713/320 |
| 2013/0067059 | A1* | 3/2013 | Gatta et al. | 709/224 |
| 2013/0067260 | A1* | 3/2013 | Gatta et al. | 713/323 |
| 2013/0304867 | A1* | 11/2013 | Srinivasan | 709/219 |

FOREIGN PATENT DOCUMENTS

| WO | 2010150199 A1 | 12/2010 |
| WO | 2011119381 A2 | 9/2011 |

OTHER PUBLICATIONS

International Search Report from International Application No. PCT/KR2012/005461 mailed Mar. 12, 2013.
Kantola, et al., "Implementing Trust-to-Trust with Customer Edge Switching", 8 pages, 2010.
Jimeno, et al., "A Network Connection Proxy to Enable Hosts to Sleep and Save Energy", IEEE 2008, pp. 101-110.

(Continued)

*Primary Examiner* — Abdullah Riyami
(74) *Attorney, Agent, or Firm* — Brundidge & Stanger, P.C.

(57) ABSTRACT

Technologies are generally described for a push management scheme for a mobile operating server. In some examples, a method performed under control of a mobile operating server may include receiving from a mobile device a request for generating one or more keep-alive messages, the request including information on a destination push server, generating the keep-alive messages, and transmitting the keep-alive messages to the destination push server.

17 Claims, 6 Drawing Sheets

(56) References Cited

OTHER PUBLICATIONS

Agarwal, S., "Toward a Push-Scalable Global Internet", IEEE 2011, pp. 797-802.

Necker, M., "Performance of Different Proxy Concepts in UMTS Networks", 16 pages, 2005.

"Smartphone Push Notification Service Problem Statement & Requirements for Signaling Minimisation", 3GPP SA WG2 Meeting #92, Jul. 5, 2012, http://www.3gpp.org/ftp/tsg_sa/WG2_Arch/TSGS2-92_Barcelona/Docs/S2-123096.zip.

* cited by examiner

PUSH MANAGEMENT SCHEME

BACKGROUND ART

Dissemination of high-end mobile electronic devices such as smartphones and tablets has led to an explosive increase in mobile data traffic. Under such a circumstance, a push technology has come into the spotlight since it can reduce not only network use but also power consumption as compared to a pulling technology.

DISCLOSURE OF INVENTION

In an example, a method performed under control of a mobile operating server may include receiving from a mobile device a request for generating one or more keep-alive messages, the request including information on a destination push server; generating the keep-alive messages; and transmitting the keep-alive messages to the destination push server.

In another example, a push management system may include a receiver configured to receive a request for generating one or more keep-alive messages from a mobile device, the request including information on a destination push server; a keep-alive message generator configured to generate the keep-alive messages; and a transmitter configured to transmit the keep-alive messages to the destination push server.

In yet another example, computer-readable storage medium may store thereon computer-executable instructions that, in response to execution, cause a push management system to perform operations, including receiving from a mobile device a request for generating one or more keep-alive messages, the request including information on a destination push server; generating the keep-alive messages; and transmitting the keep-alive messages to the destination push server.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF DRAWINGS

The foregoing and other features of this disclosure will become more apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

MODE FOR THE INVENTION

Figure 1:
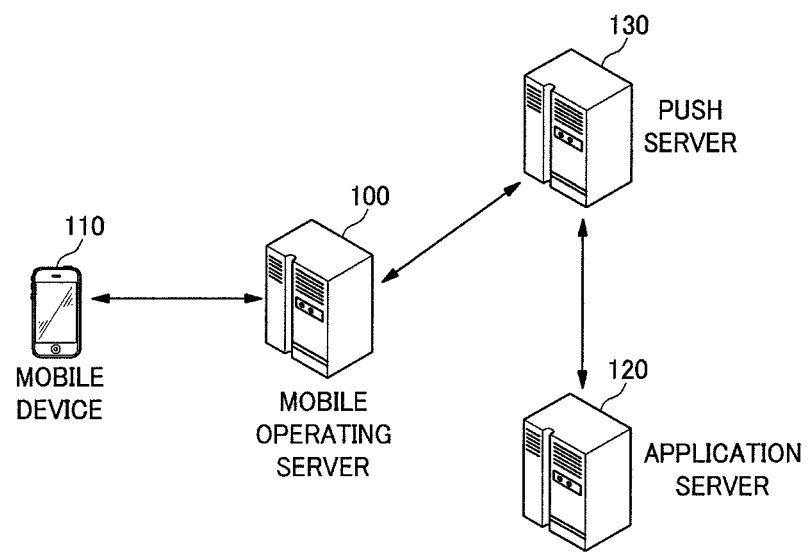
FIG. 1 schematically shows an illustrative example of an environment in which a push service may be provided to a mobile device, arranged in accordance with at least some embodiments described herein.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the drawings, can be arranged, substituted, combined, separated, and designed in a wide variety of different configurations, all of which are explicitly contemplated herein.

This disclosure is generally drawn, inter alia, to methods, apparatuses, systems, devices, and computer program products related to a push management scheme for a mobile operating server.

Technologies are generally described for letting the mobile operating server receive from a mobile device a request for generating one or more keep-alive messages, generate the keep-alive messages, and transmit the keep-alive messages periodically to a push server on behalf of the mobile device. The keep-alive messages may inform the push server that the mobile device is available for receiving data from the push server.

In some examples, the mobile device may send the request with information on the push server, which may be a destination of the keep-alive messages, and/or a keep-alive message interval for transmitting the keep-alive messages. The mobile operating server may then transmit the keep-alive messages to the destination push server at the keep-alive message interval.

In some examples, the mobile device may send the request with an identifier of the mobile device. The mobile operating server may then generate the keep-alive messages with setting an originator of the keep-alive messages as the mobile device based at least in part on the identifier of the mobile device.

In some examples, the mobile operating server may receive push data from the destination push server, and transmit to the mobile device the received push data.

In some examples, the mobile operating server may perform a device status confirmation process for the mobile device, and stop the transmitting of the keep-alive messages when the mobile device is not confirmed.

FIG. 1 schematically shows an illustrative example of an environment in which a push service may be provided to a mobile device, arranged in accordance with at least some embodiments described herein.

As depicted in FIG. 1, a mobile operating server 100 may provide a mobile device 110 a mobile telecommunications service such as, for example, third generation (3G) and/or fourth generation (4G) mobile telecommunications service. Mobile device 110 may transmit/receive data to/from mobile operating server 100. Examples of mobile device 110 may include, but are not limited to, a smartphone, a mobile phone, a personal digital assistant (PDA), a tablet, a mobile game console, a laptop, and any other devices having communications capabilities.

In some embodiments, when mobile device 110 requests to be provided with or subscribes a push service, an application server 120, i.e., a push initiator, may provide push data to mobile device 110 via a push server 130. In some embodiments, application server 120 may transmit the push data to push server 130, and push server 130 may transmit or relay the received push data to mobile device 110 through a network provided by mobile operating server 100.

In some embodiments, mobile device 110 may transmit to mobile operating server 100 a request for generating one or more keep-alive messages. In some embodiments, the request may include information on push server 130, which may be a destination of the keep-alive messages. Then, in some embodiments, mobile operating server 100 may generate the keep-alive messages and transmit them to push server 130.

In some embodiments, mobile operating server 100 may transmit the keep-alive messages periodically to push server 130. In some embodiments, mobile operating server 100 may determine a period to transmit the keep-alive messages based at least in part on the request from mobile device 110. In some embodiments, the request may include a keep-alive message interval for transmitting the keep-alive messages, and mobile operating server 100 may determine the period to transmit the keep-alive messages as the keep-alive message interval. In some embodiments, the keep-alive message interval may vary depending on at least one of an application run by mobile device 110 and a type of push data provided by push server 130.

In some embodiments, mobile operating server 100 may set an originator of the keep-alive messages as mobile device 110, instead of mobile operating server 100 itself. In some embodiments, the request may include an identifier of mobile device 110, and mobile operating server 100 may set the originator of the keep-alive messages based at least in part on the identifier of mobile device 110. In such cases, push server 130 may not need to change a destination of the push data from mobile device 110 to mobile operating server 100.

In some embodiments, mobile operating server 100 may perform a device status confirmation process for mobile device 110. When mobile device 110 is not confirmed due to, for example, power-off of mobile device 110, mobile operating server 100 may stop transmitting the keep-alive messages to push server 130. In some embodiments, mobile operating server 100 may perform the device status confirmation process periodically. In some embodiments, a period of performing the device status confirmation process may be identical to the keep-alive message interval.

Figure 2:
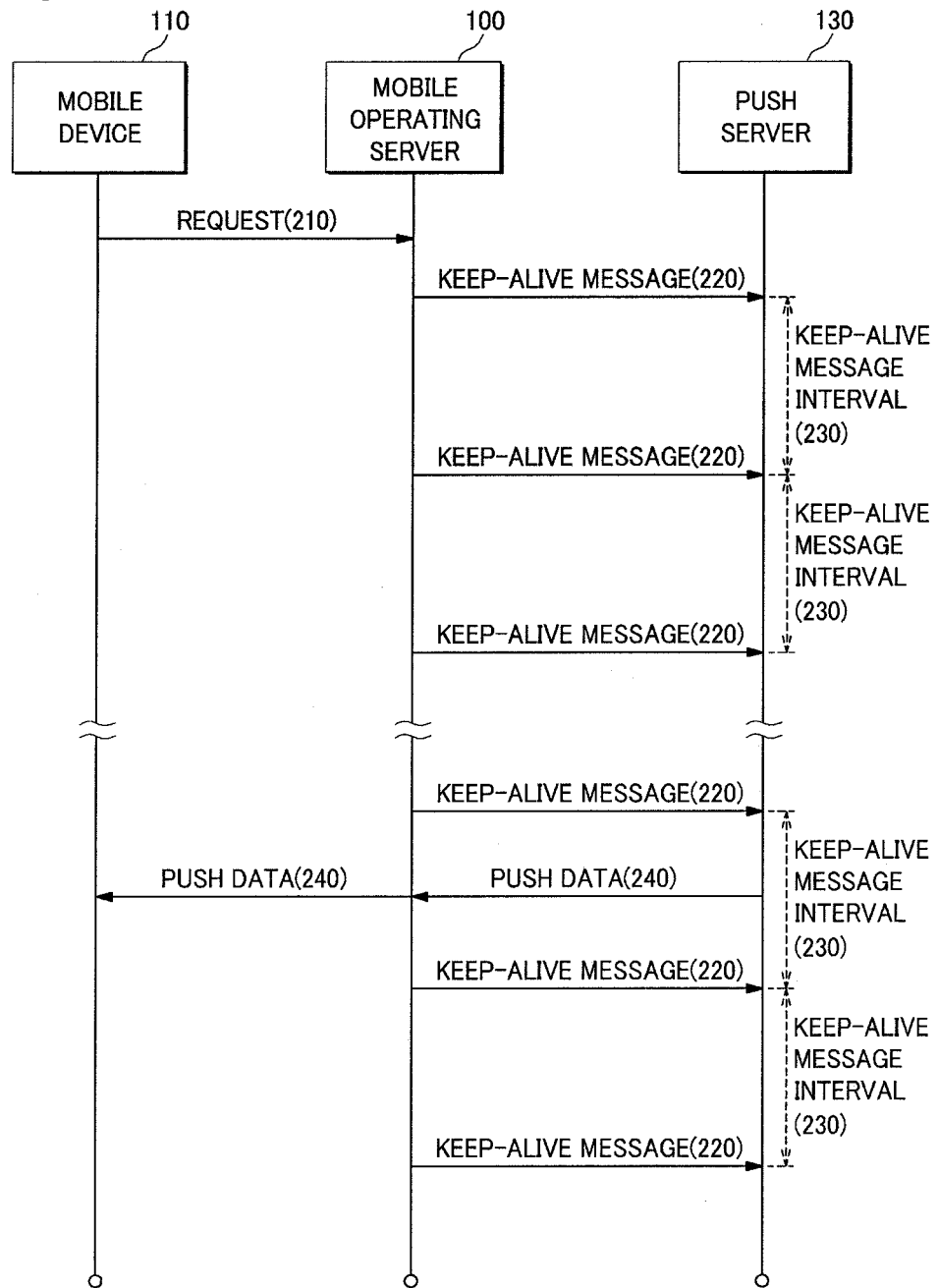
FIG. 2 schematically shows an illustrative process flow employed for providing a push management scheme for a mobile operating server, arranged in accordance with at least some embodiments described herein.

FIG. 2 schematically shows an illustrative process flow employed for providing a push management scheme for a mobile operating server, arranged in accordance with at least some embodiments described herein.

As depicted in FIG. 2, mobile device 110 may transmit to mobile operating server 100 a request 210 for generating one or more keep-alive messages 220. In some embodiments, request 210 may include information on push server 130 as a destination of keep-alive messages 220 and/or a keep-alive message interval 230 for transmitting keep-alive messages 220. Then, in some embodiments, mobile operating server 100 may transmit keep-alive messages 220 to push server 130 at keep-alive message interval 230.

In some embodiments, when push server 130 has push data 240 to send to mobile device 110, push server 130 may transmit push data 240 to mobile operating server 100, and mobile operating server 100 may transmit or relay push data 240 to mobile device 110.

Figure 3:
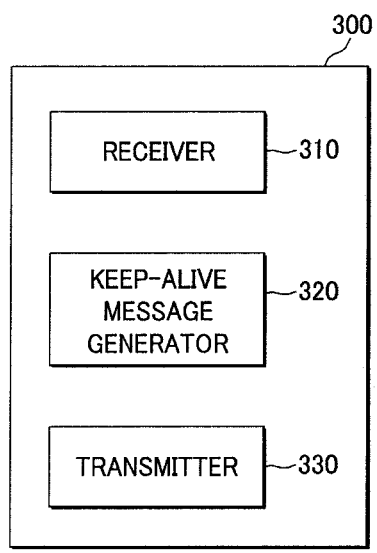
FIG. 3 shows a schematic block diagram illustrating an example architecture of a push management system for providing a push management scheme for a mobile operating server, arranged in accordance with at least some embodiments described herein.

FIG. 3 shows a schematic block diagram illustrating an example architecture of a push management system for providing a push management scheme for a mobile operating server, arranged in accordance with at least some embodiments described herein.

As depicted, a push management system 300, which may be a component of a mobile operating server (e.g., mobile operating server 100) or be separate from but still controlled by the mobile operating server, may include a receiver 310, a keep-alive message generator 320, and a transmitter 330. Although illustrated as discrete components, various components may be divided into additional components, combined into fewer components, or eliminated altogether while being contemplated within the scope of the disclosed subject matter.

Receiver 310 may be configured to receive a request (e.g., request 210) for generating one or more keep-alive messages (e.g., keep-alive messages 220) from a mobile device (e.g., mobile device 110). In some embodiments, the request may include information on a destination push server (e.g., push server 130). In some embodiments, the request may further include an identifier of the mobile device sending the request. In some embodiments, the request may further include a keep-alive message interval (e.g., keep-alive message interval 230) for transmitting the keep-alive messages.

Keep-alive message generator 320 may be configured to generate the keep-alive messages based at least in part on the request received by receiver 310. In some embodiments, keep-alive message generator 320 may generate the keep-alive messages with setting an originator of the keep-alive messages as the mobile device based at least in part on the identifier of the mobile device contained in the request.

Transmitter 330 may be configured to transmit to the destination push server the keep-alive messages generated by keep-alive message generator 320. In some embodiments, transmitter 330 may transmit the keep-alive messages to the destination push server periodically, for example, at keep-alive message interval contained in the request. In some embodiments, transmitter 330 may stop transmitting the keep-alive messages when the mobile device is not connected to a network provided by the mobile operating server.

In some embodiments, receiver 310 may further configured to receive push data from the destination push server, and transmitter 330 may further configured to transmit to the mobile device the push data received by receiver 310.

By employing push management system 300 as shown in FIG. 3, it may be possible to save network resources provided by the mobile operating server and/or reduce power consumption of the mobile device.

Figure 4:
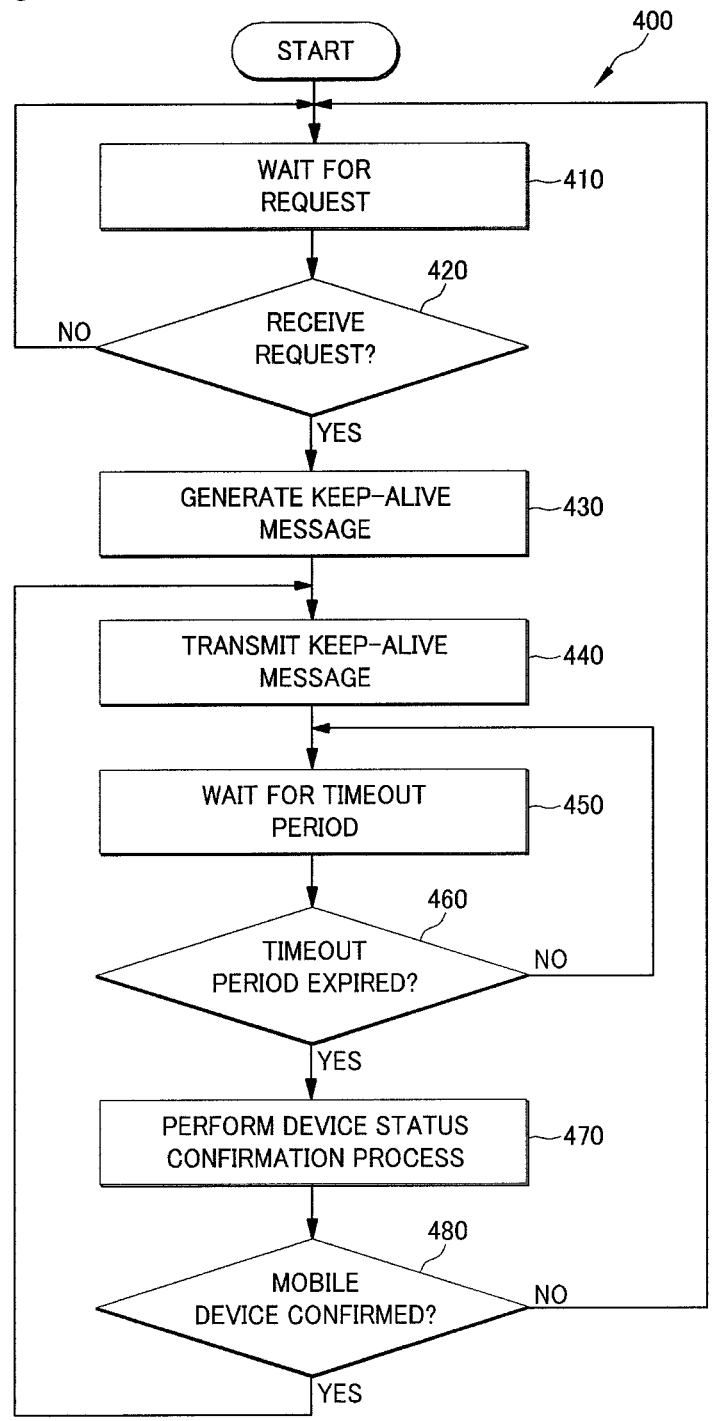
FIG. 4 shows an example flow diagram of a process for providing a push management scheme for a mobile operating server, arranged in accordance with at least some embodiments described herein.

FIG. 4 shows an example flow diagram of a process for providing a push management scheme for a mobile operating server, arranged in accordance with at least some embodiments described herein.

The process in FIG. 4 may be implemented in a mobile operating server, such as mobile operating server 100, or a push management system, such as push management system 300 including receiver 310, keep-alive message generator 320 and transmitter 330 described above. An example process 400 may include one or more operations, actions, or functions as illustrated by one or more blocks 410, 420, 430, 440, 450, 460, 470 and/or 480. Although illustrated as discrete blocks, various blocks may be divided into additional blocks, combined into fewer blocks, or eliminated, depending on the desired implementation. Processing may begin at block 410.

At block 410, the mobile operating server or the push management system may wait for a request (e.g., request 210) for generating a keep-alive message from a mobile device (e.g., mobile device 110). Processing may continue to block 420.

At block 420, the mobile operating server or the push management system may determine whether it has received the request or not. If the mobile operating server or the push management system determines that it has received the request, processing may continue to block 430. Otherwise, processing may continue back to block 410.

At block 430, the mobile operating server or the push management system may generate the keep-alive message (e.g., keep-alive message 220). In some embodiments, the mobile operating server or the push management system may generate the keep-alive message with setting an originator of the keep-alive message as the mobile device, based at least in part on an identifier of the mobile device which may be contained in the request. Processing may continue to block 440.

At block 440, the mobile operating server or the push management system may transmit the generated keep-alive message to a destination push server (e.g., push server 130). In some embodiments, the mobile operating server or the push management system may identify the destination push server based at least in part on information on the destination push server which may be contained in the request. Processing may continue to block 450.

At block 450, the mobile operating server or the push management system may wait for a timeout period to transmit the keep-alive message again. In some embodiments, the timeout period may be set as a keep-alive message interval (e.g., keep-alive message interval 230) which may be contained in the request. Processing may continue to block 460.

At block 460, the mobile operating server or the push management system may determine whether the timeout period has expired or not. If the mobile operating server or the push management system determines that the timeout period has expired, processing may continue to block 470. Otherwise, processing may continue to block 450.

At block 470, the mobile operating server or the push management system may perform a device status confirmation process for the mobile device. Processing may continue to block 480.

At block 480, the mobile operating server or the push management system may determine whether the mobile device is confirmed or not. If the mobile operating server or the push management system determines that the mobile device is confirmed, processing may continue to block 440. Otherwise, processing may continue to block 410.

As such, it may be possible to save network resources provided by the mobile operating server and/or reduce power consumption of the mobile device.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 5:
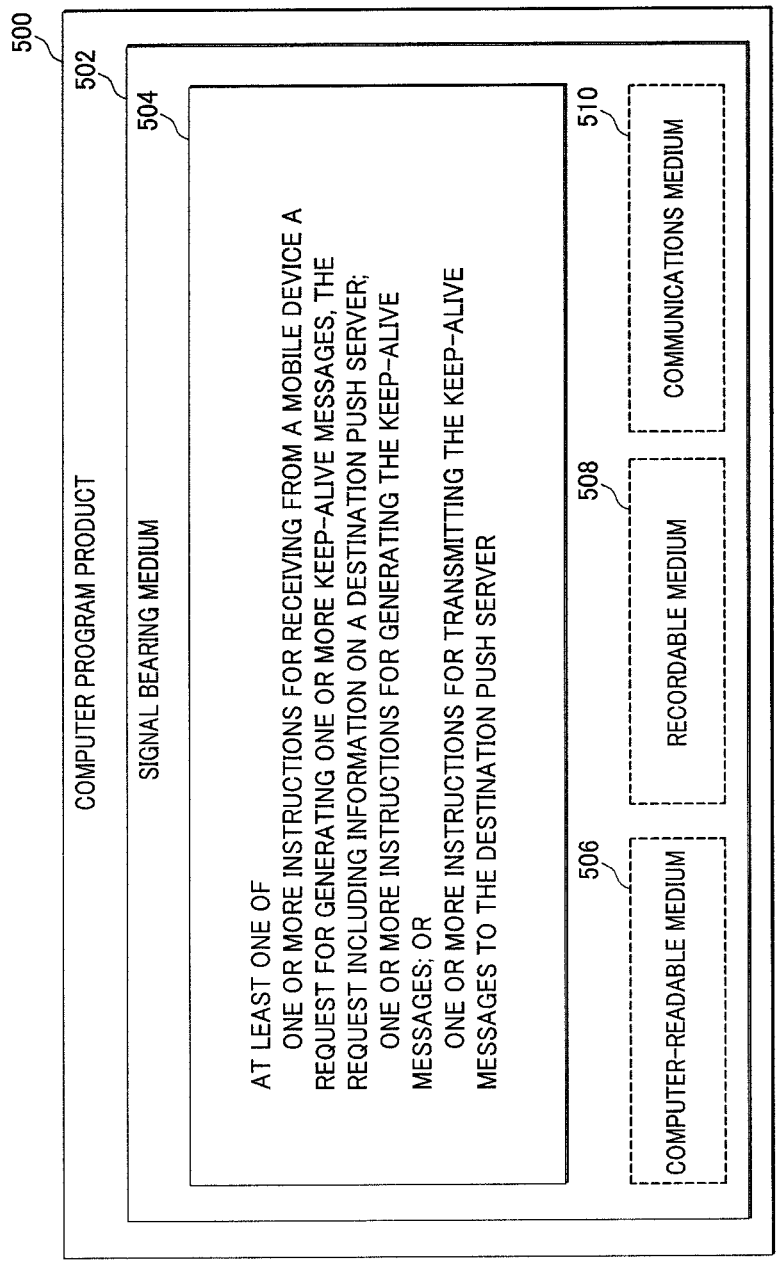
FIG. 5 illustrates example computer program products that may be utilized to provide a push management scheme, arranged in accordance with at least some embodiments described herein.

FIG. 5 illustrates example computer program products that may be utilized to provide a push management scheme, arranged in accordance with at least some embodiments described herein.

Program product 500 may include a signal bearing medium 502. Signal bearing medium 502 may include one or more instructions 504 that, when executed by, for example, a processor, may provide the functionality described above with respect to FIGS. 1-4. By way of example, instructions 504 may include: one or more instructions for receiving from a mobile device a request for generating one or more keep-alive messages, the request including information on a destination push server; one or more instructions generating the keep-alive messages; or one or more instructions for transmitting the keep-alive messages to the destination push server. Thus, for example, referring to FIG. 3, push management system 300 may undertake one or more of the blocks shown in FIG. 4 in response to instructions 504.

In some implementations, signal bearing medium 502 may encompass a computer-readable medium 506, such as, but not limited to, a hard disk drive, a CD, a DVD, a digital tape, memory, etc. In some implementations, signal bearing medium 502 may encompass a recordable medium 508, such as, but not limited to, memory, read/write (R/W) CDs, R/W DVDs, etc. In some implementations, signal bearing medium 502 may encompass a communications medium 510, such as, but not limited to, a digital and/or an analog communication medium (e.g., a fiber optic cable, a waveguide, a wired communications link, a wireless communication link, etc.). Thus, for example, program product 500 may be conveyed to one or more modules of push management system 300 by an RF signal bearing medium 502, where the signal bearing medium 502 is conveyed by a wireless communications medium 510 (e.g., a wireless communications medium conforming with the IEEE 802.11 standard).

Figure 6:
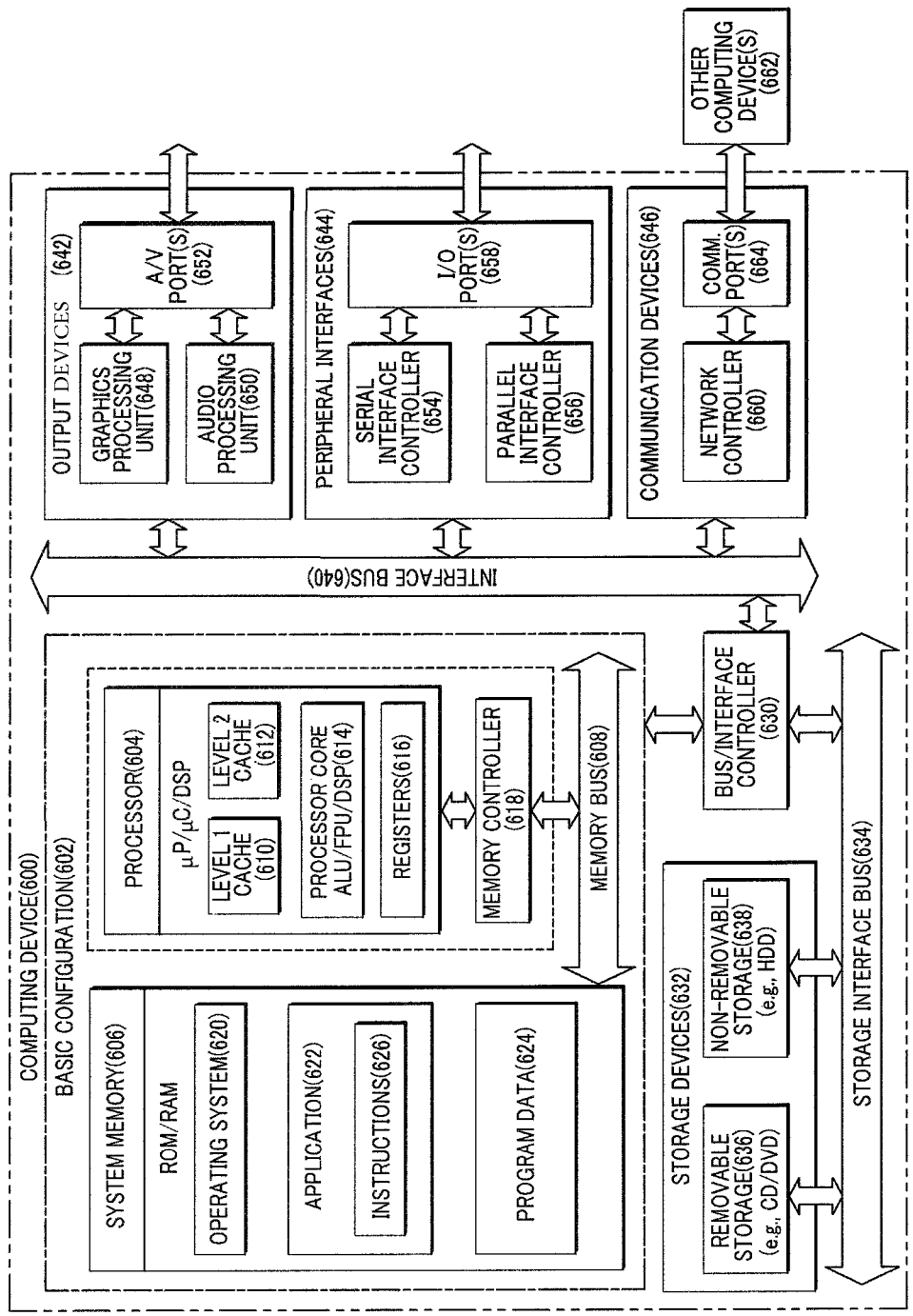
FIG. 6 is a block diagram illustrating an example computing device that may be utilized to provide a push management scheme, arranged in accordance with at least some embodiments described herein.

FIG. 6 is a block diagram illustrating an example computing device that may be utilized to provide a push management scheme, arranged in accordance with at least some embodiments described herein.

In these examples, elements of computing device 600 may be arranged or configured for a server. In a very basic configuration 602, computing device 600 typically includes one or more processors 604 and a system memory 606. A memory bus 608 may be used for communicating between processor 604 and system memory 606.

Depending on the desired configuration, processor 604 may be of any type including but not limited to a microprocessor (µP), a microcontroller (µC), a digital signal processor (DSP), or any combination thereof. Processor 604 may include one more levels of caching, such as a level one cache 610 and a level two cache 612, a processor core 614, and registers 616. An example processor core 614 may include an arithmetic logic unit (ALU), a floating point unit (FPU), a digital signal processing core (DSP Core), or any combination thereof. An example memory controller 618 may also be used with processor 604, or in some implementations memory controller 618 may be an internal part of processor 604.

Depending on the desired configuration, system memory 606 may be of any type including but not limited to volatile memory (such as RAM), non-volatile memory (such as ROM, flash memory, etc.) or any combination thereof. System memory 606 may include an operating system 620, one or more applications 622, and program data 624. Application 622 may include instructions 626 that may be arranged to perform the functions as described herein including the actions described with respect to the push management system 300 architecture as shown in FIG. 3 or including the actions described with respect to the flow charts shown in FIG. 4. In some examples, application 622 may be arranged to operate with program data 624 on an operating system 620 such that implementations for instructions for a mobile operating server as described herein.

Computing device 600 may have additional features or functionality, and additional interfaces to facilitate communications between basic configuration 602 and any required devices and interfaces. For example, a bus/interface controller 630 may be used to facilitate communications between basic configuration 602 and one or more data storage devices 632 via a storage interface bus 634. Data storage devices 632 may be removable storage devices 636, non-removable storage devices 638, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 606, removable storage devices 636 and non-removable storage devices 638 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

Computing device 600 may also include an interface bus 640 for facilitating communication from various interface devices (e.g., output devices 642, peripheral interfaces 644, and communication devices 646) to basic configuration 602 via bus/interface controller 630. Example output devices 642 include a graphics processing unit 648 and an audio processing unit 650, which may be configured to communicate to various external devices such as a display or speakers via one or more A/V ports 652. Example peripheral interfaces 644 include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 646 includes a network controller 660, which may be arranged to facilitate communications with one or more other computing devices 662 over a network communication link via one or more communication ports 664.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 600 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

The invention claimed is:

1. A method comprising:
   receiving, by a mobile operating server, from a mobile device a request for generating one or more keep-alive messages, the request including information on a destination push server;
   generating, by the mobile operating server, the keep-alive messages; and
   transmitting, by the mobile operating server, the keep-alive messages to the destination push server,
   wherein the transmitting includes transmitting the keep-alive messages periodically to the destination push server.

2. The method of claim 1, wherein the request further includes an identifier of the mobile device, and
   wherein the generating includes generating the keep-alive messages with setting an originator of the keep-alive messages as the mobile device.

3. The method of claim 1,
   wherein the request further includes a keep-alive message interval for transmitting the keep-alive messages, and
   wherein the transmitting includes transmitting the keep-alive messages based on the keep-alive message interval.

4. The method of claim 3, wherein the keep-alive message interval varies depending on an application run by the mobile device.

5. The method of claim 1, further comprising:
   receiving push data from the destination push server; and
   transmitting to the mobile device the push data received from the destination push server.

6. The method of claim 5, wherein the destination push server receives the push data from an application server.

7. The method of claim 1, further comprising:
   performing a device status confirmation process for the mobile device; and
   stopping the transmitting when the mobile device is not confirmed.

8. A push management system comprising:
   a receiver configured to receive a request for generating one or more keep-alive messages from a mobile device, the request including information on a destination push server;
   a keep-alive message generator configured to generate the keep-alive messages; and
   a transmitter configured to transmit the keep-alive messages to the destination push server,
   wherein the transmitter is further configured to transmit the keep-alive messages periodically to the destination push server, and
   wherein the push management system is controlled by a mobile operating server.

9. The push management system of claim 8, wherein the request further includes an identifier of the mobile device, and
   wherein the keep-alive message generator is further configured to generate the keep-alive messages with setting an originator of the keep-alive messages as the mobile device.

10. The push management system of claim 8,
   wherein the request further includes a keep-alive message interval for transmitting the keep-alive messages, and
   wherein the transmitter is further configured to transmit the keep-alive messages based on the keep-alive message interval.

11. The push management system of claim 10, wherein the keep-alive message interval varies depending on an application run by the mobile device.

12. The push management system of claim 8, wherein the receiver is further configured to receive push data from the destination push server, and the transmitter is further configured to transmit to the mobile device the push data received from the destination push server.

13. The push management system of claim 8, wherein the transmitter is further configured to stop transmitting the keep-alive messages when it is determined that the mobile device is not connected to a network provided by the mobile operating server.

14. A non-transitory computer-readable storage medium having stored thereon computer-executable instructions that, in response to execution, cause a push management system to perform operations, comprising:

receiving, by a mobile operating server, from a mobile device a request for generating one or more keep-alive messages, the request including information on a destination push server;

generating, by the mobile operating server, the keep-alive messages; and transmitting, by the mobile operating server, the keep-alive messages to the destination push server, wherein the transmitting includes transmitting the keep-alive messages periodically to the destination push server.

15. The non-transitory computer-readable storage medium of claim 14, wherein the request further includes an identifier of the mobile device, and wherein the generating includes generating the keep-alive messages with setting an originator of the keep-alive messages as the mobile device.

16. The non-transitory computer-readable storage medium of claim 14, wherein the request further includes a keep-alive message interval for transmitting the keep-alive messages, and wherein the transmitting includes transmitting the keep-alive messages based on the keep-alive message interval.

17. The method of claim 7, wherein the transmitting includes transmitting the keep-alive messages based on a keep-alive message interval, and the keep-alive message interval varies depending on a period of performing the device status confirmation.

* * * * *